United States Patent [19]
Reiss et al.

[11] 4,058,721
[45] Nov. 15, 1977

[54] GAMMA CAMERA

[75] Inventors: Karl Hans Reiss, Erlangen; Otto Kotschak, Buckenhof; Bernhard Conrad, Erlangen, all of Germany

[73] Assignee: Siemens Aktiengesellschaft, Berlin & Munich, Germany

[21] Appl. No.: 658,050

[22] Filed: Feb. 13, 1976

[30] Foreign Application Priority Data
Feb. 19, 1975 Germany .................. 2507150

[51] Int. Cl.² .......................... H01J 31/50; G01T 1/18
[52] U.S. Cl. .............................. 250/213 VT; 250/374; 250/385
[58] Field of Search ............... 250/213 VT, 374, 385

[56] References Cited
U.S. PATENT DOCUMENTS

| | | | |
|---|---|---|---|
| 3,772,521 | 11/1973 | Perez-Mendez | 250/385 |
| 3,786,270 | 1/1974 | Borkowski et al. | 250/385 |
| 3,890,506 | 6/1975 | Berninger | 250/213 VT X |

Primary Examiner—Archie R. Borchelt
Attorney, Agent, or Firm—Hill, Gross, Simpson, Van Santen, Steadman, Chiara & Simpson

[57] ABSTRACT

A gamma camera within a signal generating system encompassing a stage converting an image which is to be photographed into an electron image, following which there is a locating or position-finding system from which signals emanate which facilitate the pictorial reproduction of the incident radiation.

10 Claims, 3 Drawing Figures

GAMMA CAMERA

FIELD OF THE INVENTION

The present invention relates to a gamma camera within a signal generating system encompassing a stage converting an image which is to be photographed into an electron image, following which there is a locating or position-finding system from which signals emanate which facilitate the pictorial reproduction of the incident radiation. For example, such cameras are utilized in the diagnosis with penetrating rays, such as those with radioactive isotopes. These cameras are also applicable with X-rays. An arrangement of the type which is relative to the invention is known, for example, from British Pat. No. 1,174,558.

DISCUSSION OF THE PRIOR ART

In apparatus of the known type, the distribution of radioactive materials is ascertained through determination of the distribution of the rays emanating therefrom, predicated on the basis of the light which is generated in a scintillation layer. For this purpose, a plurality of photoelectric transducers are associated with the layer and an electronic installation for producing electronic signals corresponding to the positive and brightness of the scintillations in the scintillation layer, as well as a viewing apparatus which is controlled by this installation. Moreover, in an arrangement there is located an image intensifier intermediate the scintillation layer and the transducer, which transmits the scintillation to the transducers at an enhanced brightness. In contrast with the known so-called Auger-cameras which are constructed without image intensifiers, this arrangement evinces an increased recording sharpness and sensitivity. However, in all of these apparatus, which are known as gamma cameras, mutually well correlated photoelectric transducers are always necessary so as to be able to achieve sufficiently definitive localizations.

SUMMARY OF THE INVENTION

Accordingly, it is an object of the present invention to incorporate a construction in a gamma camera of the above-mentioned type, including a stage for converting an image to be photographed into an electron image, and a position-finding system being connected thereto, which is considerably simplified with respect to the state of the art and in which, in addition to good localization, it is also possible to obtain energy discrimination. The foregoing object is inventively attained in that the converting stage has a multi-wire proportioning chamber connected thereto by means of an electron-transmissive window.

Through the combination of a stage which converts the image which is to be reproduced into an electron image, at whose output where is located an electron-transmissive window, to which there is connected a multi-wire proportioning chamber, with reproducing installations which are sufficiently simple for the proportioning chamber, the disadvantages which adhere to the two units become ineffective to the greatest extent. An electronic image intensifier which is applicable as a converter stage evidences a construction in which, due to the lack of a signal output, it is difficult to obtain an energy discrimination. The latter is only possible through the interposition of additional constructional components. For example, this may be the combination of a multiplier which serves for the formation of a signal, with a shutter tube which is controlled through intermediary of this signal. However, this provides an arrangement of great complexity.

In known multi-wire proportioning chambers, a simple signal formation with energy discrimination and position-finding is in itself possible. The response capacity for penetrating radiation, such as gamma rays, as occurs in nuclear medicine is however quite low.

Only through the inventive combination will the quite effective conversion of the rays into electrons, which take place, for instance, in an image intensifier, be utilizable for the similarly quite effective reception of electrons in proportioning chamber.

For the preparation of X-ray images there is namely known a process in which there is employed an electronic X-ray image intensifier, whose output represents a Lenard-type window. The electrons which exit therethrough are brought into effect on a photographically or chemically changeable layer so as to be converted into visible images. However, such an arrangement has not found applicability in the X-ray technology inasmuch as no advantages are derived hereby during radioscopy, since the usual arrangements must anyway be present; during exposure the small image is disturbing large Lenard window in turn require support grids which again produce an interferring structure; for films there are encountered technical difficulties in applying the film at higher change frequencies.

On the other hand, multi-wire proportioning chambers are known. The latter are utilized for indicating the presence of charged particles in nuclear physics. However, for reproduction of gamma rays or similar penetrating rays, such a chamber has an indicating sensitivity which is too low. Attempts have been made to increase the absorption probability for gamma rays by preshaping. However, these related only to soft gamma rays or soft X-rays of intensities which are much too high for gamma ray diagnostic (compare "Am. Journ. Roentg." 113 (1971) 378). Merely the delivery, respectively rendering visible, of the signals through delays conduits would be also adequate for the rendering visible of gamma ray images of lower intensity.

Within the scope of the invention, all arrangements are applicable as converter stages in which there is obtained from the incident rays an electron image which is proportional with regard to the distribution of the rays density. Moreover, this electron image must be made available in an adjoining room which contains the multi-wire chamber, meaning the position-finding or locating installation. An arrangement of this type is, for instance, a so-called electronic image intensifier in which the incoming rays are converted into electrons in a photocathode. Hereby, the photocathode layer may also have a scintillation layer connected ahead thereof so as to effect an additional increase in the ray conversion. A further intensification can also be obtained, in a known manner, through an electron-optical reduction of the image. The reduced electron image is then brought outwardly of the vacuum tube through an electron-transmissive window. The window may hereby be constituted of a natural material, such as a metal or a compound, or of a plastic material. Known materials are, for example, foils formed of aluminum oxide, of mica or glass, or of a plastic material such as polyimide or, however, a metal such as aluminum or beryllium.

Proportioning chambers are usable as a position finding or locating arrangement in which the electrodes, between which there is located the gas filling of the proportioning chambers, are so arranged that signals can be taken off which distinguish from each other in dependence upon their locations. Arrangements of this type generally consist of mutually adjacent and parallel positioned strips or wires, of which there are constituted the two electrodes. Hereby, the strips of the one electrode extend in one direction which encompasses an angle with regard to the run of the strips of the other electrode. In using wires as strips, there is obtained a so-called known multi-wire proportioning chamber (herein only a generally employed designation).

In a chamber of the above-mentioned type, there are obtained impulses of 2 V, which extend over about 1 $\mu$sec for quantums or energy elements of 22 keV in xenon. In the xenon there are absorbed 20% of these energy elements so as to produce about $10^3$ electrons for each absorbed quantum. In the herein described combination there are produced at the input of the image intensifier about 500 electrons for each absorbed quantum (140 keV, scintillation crystal and photocathode).

In an argon-methane mixture, the electrons need about 30 eV for producing a charge carrier pair, meaning, after acceleration to 20 keV there are produced 30,000 electron/impulses at the input grid of the multi-wire chamber. The subsequent amplification in the inhomogeneous electrical field increases the number once again by a factor of about 1000.

Desired as a gas filling is a gas having a high density so as to hold the range of the electrons as low as possible and to thereby maintain low any additional loss in resolution. In a known manner, xenon is suitable for this purpose; less expensive is Frigen F13, meaning trifluorobrommethane ($CF_3Br$), in particular when the chamber is to be rinsed.

Through backscattering in the Lenard window there is reduced the number of the electrons entering into the chamber, for example to 45% at 4 $\mu$ polyimide and 30 kV accelerating voltage. However, for the impulse height this is unimportant as compared with the above recovery through the image intensifier. The corresponding is also applicable to coating losses through a support grid.

BRIEF DESCRIPTION OF THE DRAWINGS

Further details and advantages of the invention may now be ascertained from the following description of exemplary embodiments thereof, taken in conjunction with the accompanying drawings; in which.

DETAILED DESCRIPTION

Figure 1:
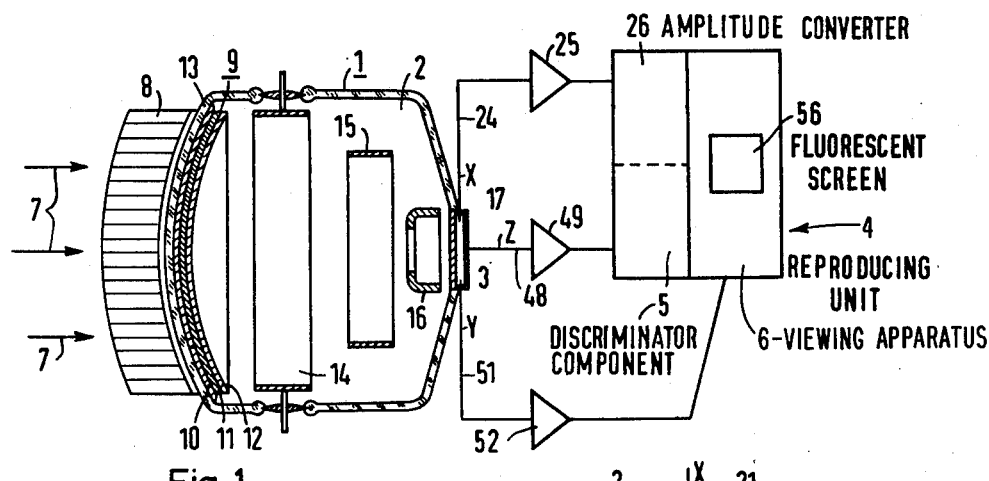
FIG. 1 illustrates a general schematic view of an arrangement pursuant to the invention.
Figure 2:
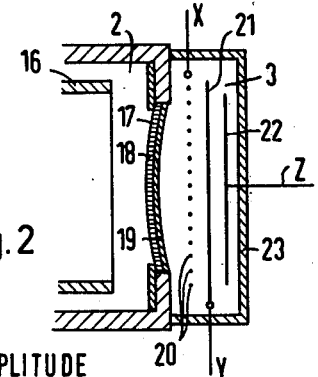
FIG. 2 shows an enlarged view of the transition of the image intensifier into the proportioning chamber.
Figure 3:
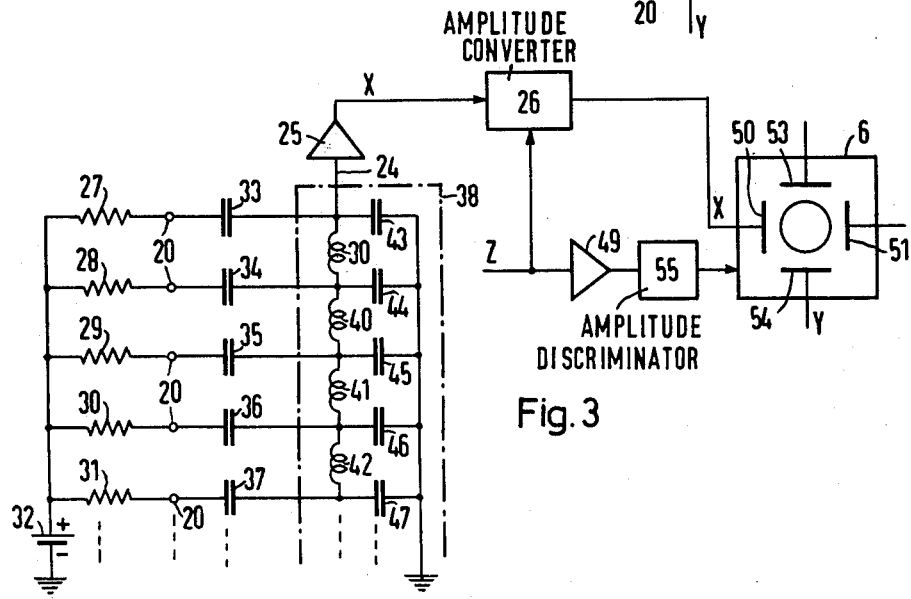
FIG. 3 shows a circuit diagram representative of a locating and reproducing system.

Designated in FIG. 1 by reference numeral 1 is the actual camera, meaning an arrangement with which there can be effectuated the preparation of gamma ray images, and which encompasses an image intensifier 2 and a proportioning chamber 3. Connected to this arrangement is a reproducing unit 4 which, in addition to a discriminator component 5, contains a viewing apparatus 6. Upon the incidence of penetrating rays in the direction of the arrows 7, these pass through channels of a known per se collimator 8, which are separated from each other by ray-absorbent walls, into the transducer arrangement 9 of the image intensifier 2. This transducer arrangement represents a so-called electronic vacuum image intensifier and consists of a carrier 10, a scintillation layer 11 and a photocathode layer 12. The rays pass beyond the collimator 8 through the inlet window 13 of the image transducer 2, and thereafter also traverse the carrier or base layer 10 of the arrangement 9. Upon the rays entering into the scintillation layer 11, they release light which is converted into electrons in the photocathode layer 12. Since the two conversions are carried out proportionally to the incident rays, there is obtained an electron image at the photocathode layer which is then imaged on an outlet or target window 17 by means of a ring-shaped electrodes 14, 15 and an anode 16. Through the window 17, the electrons drop into the arrangement 3. The electrons hereby, on the one hand, traverse a support 18 and a vacuum-sealed layer 19, wherein 18 consists of a support grid and 19 consists of a 4 $\mu$m thick polyimide foil or 2.5 $\mu$m thick mica. In the interior space of the arrangement 3 there is located a mixture of argon-methane at atmospheric pressure as the filler gas. In this gas chamber, following the foil 19 is a grid which is constituted of parallel, adjacent positioned wires 20. Located at a distance of 0.7 mm is a second grid, similarly formed of mutually parallel positioned wires in which the wires extend in a direction which encompasses a right angle with the direction of the wires 20, then; thereafter, at a distance of 0.7 mm there follows a plate-shaped electrode 22 which lies on the wall of the housing 23 of the arrangement 3 located opposite the foil 19.

A conductor 24 leads from the X-grid formed by the wires 20 through an amplifier 25 and an impulse height or amplitude converter 26 to the reproducing unit 4. The signals which are to be indicated are hereby obtained in that the wires 20 are connected, through working resistances 27 through 31 and so forth, to a voltage supply source 32. On the other side, the wires 20 are connected through coupling condensers 33 through 37 to a known delay conduit 38 which is producible in the region associated with the respective wire 20, by means of an inductance 39 through 42 and so forth, and a capacitor 43 to 47 and so forth. Connected to the end of the delay conduit which is opposite to its grounded end, is the conduit 24 leading to the reproducing unit 4. The signal is so influenced in a timed proportionality in the time-impulse amplitude converter 26 by the Z-signal which is received through the conduit 48 and the amplifier 49, so that a signal corresponding to the required deflection in the X-direction, meaning an X-locating signal, is transmitted to the deflector plates 50, 51. In a corresponding manner, from a Y-signal which is received through the conduit 51 and the preamplifier 52, there is applied a deflecting signal in the Y-direction to the plates 53 and 54. Thereby there is obtained an image on the fluorescent screen of the Braun tube 56 which corresponds to the positioned distribution of the gamma rays. Hereby, above all, it is also necessary that, from the Z-signal, there is transmitted to the unit 4 a brightness scanning signal through an impulse amplitude discriminator 55.

While there has been shown what is considered to be the preferred embodiment of the invention, it will be obvious that modifications may be made which come within the scope of the disclosure of the specification.

What is claimed is:

1. In a gamma camera within a signal generating system, encompassing a stage for converting an image which is to be produced into an electron image; and including a locating system connected to the output of said stage, said locating system emanating signals facilitating the pictorial reproduction of the incident radiation, the improvement comprising: said converting stage including an electron-transmissive window; and a multi-wire proportioning chamber being connected to said converting stage through intermediary of said window.

2. A camera as claimed in claim 1, said converting stage comprising an electronic vacuum image intensifier.

3. A camera as claimed in claim 1, said chamber being filled with a gas constituted of trifluorobrommethane at about atmospheric pressure.

4. A camera as claimed in claim 1, comprising delay conduits for positioning the signals of said multi-wire proportioning chamber.

5. A camera as claimed in claim 1, comprising a reproducing unit for said pictorial reproduction; and an impulse amplitude discriminator being connected intermediate said proportioning chamber and said reproducing unit.

6. A camera as claimed in claim 1, said electron-transmissive window being vacuum-sealed and pervious to electrons.

7. A camera as claimed in claim 6, said electron-transmissive window comprising a support grid and a vacuum-sealed layer pervious to electrons.

8. A camera as claimed in claim 7, said vacuum-sealed layer being a foil made of a material selected from the group consisting of aluminium-oxide, mica, glass, polyimide, aluminium and beryllium.

9. A camera as claimed in claim 8, wherein the foil being 4 $\mu$m thick polyimide foil.

10. A camera as claimed in claim 8, wherein the foil being 2.5 $\mu$m thick mica foil.

* * * * *